Patented July 11, 1933

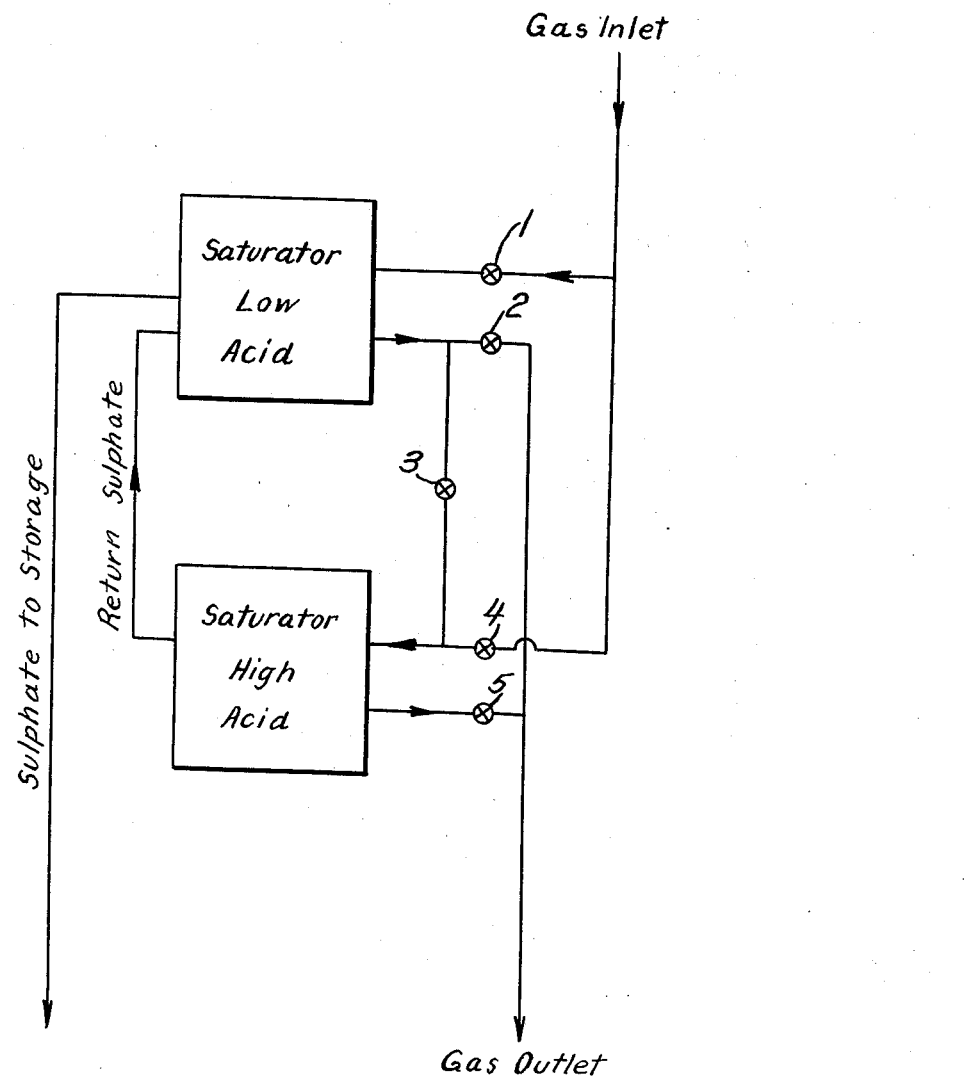

1,917,915

UNITED STATES PATENT OFFICE

CHRISTOPHER G. ATWATER, OF TARRYTOWN, NEW YORK, ASSIGNOR TO THE BARRETT COMPANY, OF NEW YORK, N. Y., A CORPORATION OF NEW JERSEY

PROCESS OF PRODUCING AMMONIUM SULPHATE

Application filed July 7, 1930. Serial No. 466,125.

This invention relates to the production of ammonium sulphate from coke oven or similar gases, and has for its object the provision of an improved method facilitating the production of larger crystals of sulphate, better in quality and less liable to absorb moisture and become caked.

According to the practice generally employed, ammonium sulphate is produced from coke oven and similar gases by passing the gases through a saturator containing sulphuric acid. A low strength of acid is conducive to the formation of large crystals of sulphate, which are more desirable than those of small size.

With a low strength acid, however, an appreciable part of the ammonia contained in the gases is lost, because the acid is not capable of extracting all of it in the limited time of passage. Therefore, although the use of a low strength acid ensures the production of crystals of large size, it nevertheless has the disadvantage of resulting in an appreciable loss of ammonia. It also renders accurate control more difficult, as a drop in acid strength of the weak acid may result in loss of ammonia, whereas a reduction in strength of the stronger acid is not so detrimental.

It is the purpose of the present invention to overcome, so far as possible, the above mentioned disadvantage and yet not hamper the production of sulphate crystals of desirable size.

Generally speaking, the present invention concerns a method providing for the passage of the ammonia containing gases through a series of saturators containing acid of successively greater concentration, whereby the ammonia which is not extracted in one is extracted in another of the saturators. The invention provides further for the transfer of the sulphate from succeeding saturators back to the one having an acid bath of a strength most conducive for the formation of crystals of large size.

For practical purposes, the saturators in the series need not exceed two in number, provided the acid bath of the second saturator is of sufficient concentration to extract substantially all of the ammonia passed over from the first saturator.

As an example of such an installation, reference is made to the accompanying flow sheet, which, together with the description relating thereto, is intended to serve merely as a typical illustration of the invention described.

Considering the flow sheet more in detail, the ammonia-containing gases are supplied through a suitable piping system to a saturator containing acid of low strength, from which they pass into a second saturator, containing acid of higher strength before being discharged to the gas holder.

A piping arrangement which may be used satisfactorily is represented in the drawing, wherein each saturator is shown as being provided with an inlet pipe connected to the gas supply and an outlet pipe connected to the gas outlet. An additional pipe connecting the outlet of the first saturator to the inlet of the second saturator is also provided. To permit proper control, each pipe is equipped with a suitable valve. Accordingly, when the saturators are to be operated in series, valves 1, 3 and 5 are opened and valves 2 and 4 closed. If for any reason independent operation is to be effected, valve 3 in the connecting pipe is closed and the remaining valves opened.

In most instances an acid strength of approximately 2½% will be found suitable for the first saturator while the bath of the second may be made as high as 5-6% or even higher.

The first bath being of suitably low concentration, the gases passing therethrough combine with the sulphuric acid to form large crystals of ammonium sulphate, and then pass into the second saturator, where the last traces of ammonia are extracted to form sulphate crystals of small size. The small crystals and/or the strong ammonium sulphate solution thus formed in the second saturator are introduced into the first saturator and therein built up into large crystals, after which they may be periodically or continuously discharged to suitable centrifuges and storage bins.

As is to be expected, the transfer of the sulphate from the second saturator to the first results in the addition of a certain amount of higher strength acid to the bath of the first saturator, but such condition may be utilized to eliminate the necessity for periodically adding fresh acid to the first saturator. In fact, the entire amount of fresh acid, which it may be found necessary to add to the saturators to keep them at the desired concenration, may all be added to the second saturator, and the transfer of sulphate so regulated as to ensure the passage of the required amount of higher strength acid to the first saturator to keep it at proper strength.

It is fully realized that as a suitable operating unit two interconnected saturators have been proposed before, but so far as is known, the acid strength has been the same in each and the two saturators have been used only to permit the cutting out of one for repair without interfering with the operation of the plant. Series operation of two or more saturators in the manner of the present method has heretofore never been practiced.

However, by properly rearranging the piping, which would have to be worked out in accordance with the conditions existing in each plant, a unit of two saturators intended for alternate operation can be connected up to operate in series in accordance with the present invention. This may require increasing the delivery pressure of the exhauster a sufficient amount to take care of the passage of the gases through the additional saturator. However, in some cases it will be unnecessary to carry the usual depth of seal on the second saturator in order to accomplish substantially complete removal of ammonia from the gas particularly when using relatively strong acid in the second saturator.

I claim:

1. A method of producing large crystals of ammonium sulphate from ammonia-containing gases, which comprises passing the gases successively through a series of saturators each containing sulphuric acid of different strength, the acid in the first of said saturators being of a strength conducive to the formation of large crystals of sulphate, forming crystals of smaller size in a succeeding saturator, returning the sulphate crystals formed in said succeeding saturator to said first saturator, and retaining said returned sulphate crystals in said first saturator until the crystal size thereof is substantially larger than that of the sulphate crystals formed in said succeeding saturator.

2. A method according to claim 1 in which the acid in said first saturator is of about $2\frac{1}{2}\%$ strength and the acid in said succeeding saturator is of about 5–6% strength.

3. A method of producing large crystals of ammonium sulphate from ammonia containing gases which comprises continuously passing gases successively through a series of saturators, each containing sulphuric acid of different strength, the acid in the first of said saturators being of a strength conducive to the formation of large crystals of sulphate, continuously forming crystals of smaller size in a succeeding saturator, returning the sulphate crystals formed in said succeeding saturator to said first saturator, retaining said returned sulphate crystals in said first saturator until the crystal size thereof is substantially larger than that of the sulphate crystals from said succeeding saturator and continuously removing large crystals of sulphate from said first saturator.

CHRISTOPHER G. ATWATER.